United States Patent
Le et al.

(10) Patent No.: US 10,525,535 B1
(45) Date of Patent: Jan. 7, 2020

(54) PORTABLE AND RECHARGEABLE DRILL SYSTEM

(71) Applicants: Kevin Le, Richland Hills, TX (US); Thanh Le, Arlington, TX (US); Abhishek Vinod Vazrekar, Arlington, TX (US)

(72) Inventors: Kevin Le, Richland Hills, TX (US); Thanh Le, Arlington, TX (US); Abhishek Vinod Vazrekar, Arlington, TX (US)

(73) Assignee: Luraco, Inc., Arlington, TX (US)

( * ) Notice: Subject to any disclaimer, the term of this patent is extended or adjusted under 35 U.S.C. 154(b) by 0 days.

(21) Appl. No.: 16/122,874

(22) Filed: Sep. 5, 2018

(51) Int. Cl.
*B23B 45/02* (2006.01)
*H02K 7/14* (2006.01)
*H02K 11/28* (2016.01)
*H02J 7/00* (2006.01)

(52) U.S. Cl.
CPC .......... *B23B 45/02* (2013.01); *H02J 7/0047* (2013.01); *H02J 7/0052* (2013.01); *H02K 7/145* (2013.01); *H02K 11/28* (2016.01); *B23B 2250/16* (2013.01); *B23B 2260/024* (2013.01); *B23B 2260/036* (2013.01); *B23B 2260/062* (2013.01); *B23B 2270/022* (2013.01); *B23B 2270/32* (2013.01); *H02J 2007/005* (2013.01)

(58) Field of Classification Search
CPC ....... H02K 11/28; H02K 7/145; H02J 7/0047; H02J 7/0052; H02J 7/0004; H02J 7/0003; B23B 45/02; B23B 47/06; B23B 31/1071; B25F 5/02
See application file for complete search history.

(56) References Cited

U.S. PATENT DOCUMENTS

| | | | | |
|---|---|---|---|---|
| 6,137,280 A * | 10/2000 | Ackermann | .......... | H02J 7/0008 323/224 |
| 6,786,685 B2 * | 9/2004 | Schaub | .............. | B23B 31/1071 279/75 |
| 2011/0180286 A1 * | 7/2011 | Oomori | ................... | B25F 5/008 173/20 |
| 2012/0014065 A1 * | 1/2012 | Haga | .................... | B25B 21/002 361/697 |
| 2012/0292063 A1 * | 11/2012 | Forster | ..................... | B25F 5/00 173/18 |
| 2014/0327396 A1 * | 11/2014 | Rejman | ................. | H01M 10/44 320/108 |
| 2015/0188332 A1 * | 7/2015 | Nakano | ................. | H02J 7/0004 320/112 |
| 2015/0318716 A1 * | 11/2015 | Pickens | ................. | H02J 7/0003 320/110 |
| 2017/0259424 A1 * | 9/2017 | Vetter | .................... | B25H 3/006 |

* cited by examiner

*Primary Examiner* — Nicole N Ramos
(74) *Attorney, Agent, or Firm* — Hoang Steve Ngo

(57) ABSTRACT

The present invention is a portable and rechargeable drill system that allows a user to conveniently carry on the user's body and perform work. As a preferred and non-limiting example, the portable and rechargeable drill system is lightweight and is comprised of a drill handpiece, a battery-powered control device, and a securing member or mechanism for the drill handpiece. The drill system may further comprise a control device case or holder. The drill handpiece preferably comprises a first end, a second end, a drill bit-spindle and housing assembly, a drill bit locking mechanism, a motor and housing assembly, and a power cord.

93 Claims, 10 Drawing Sheets

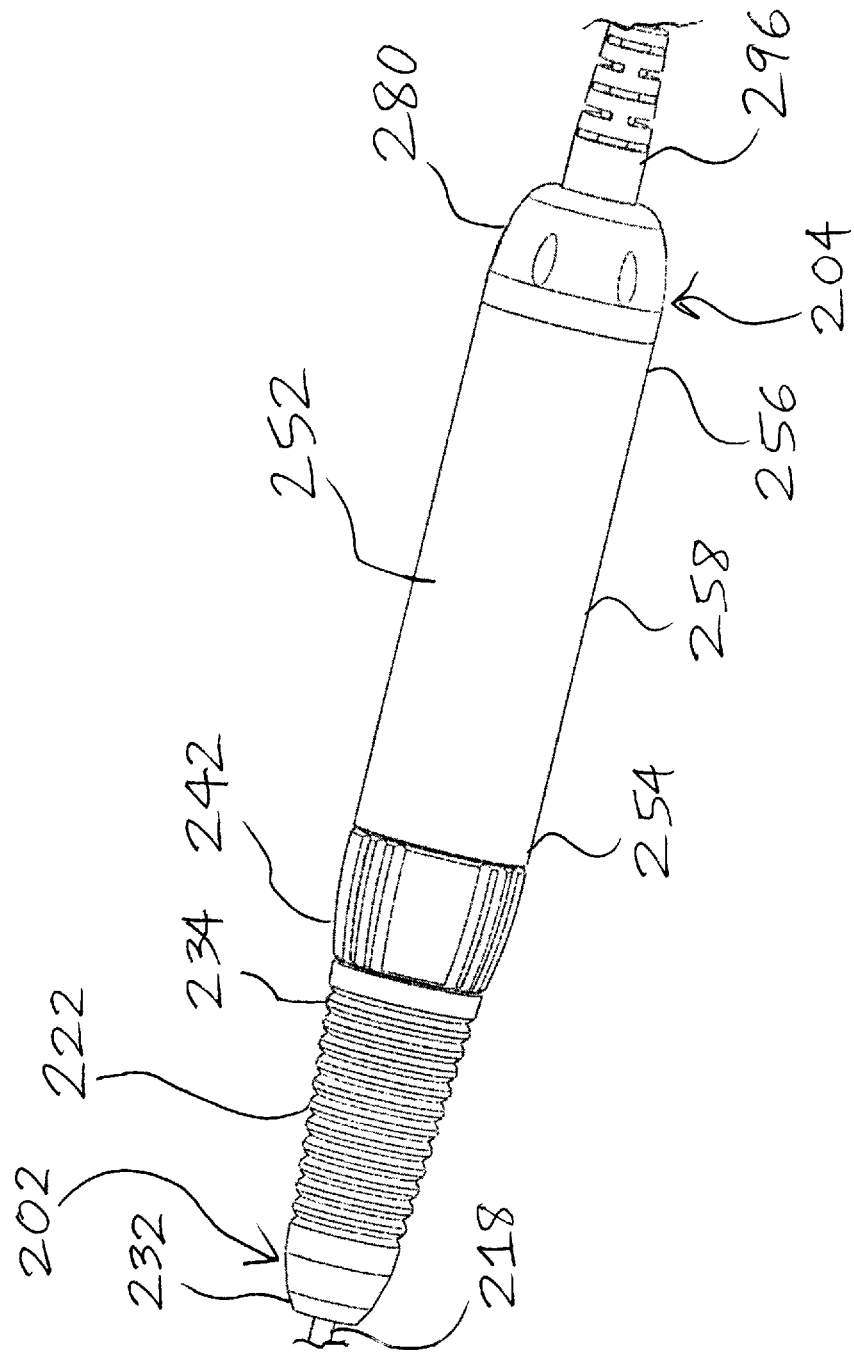

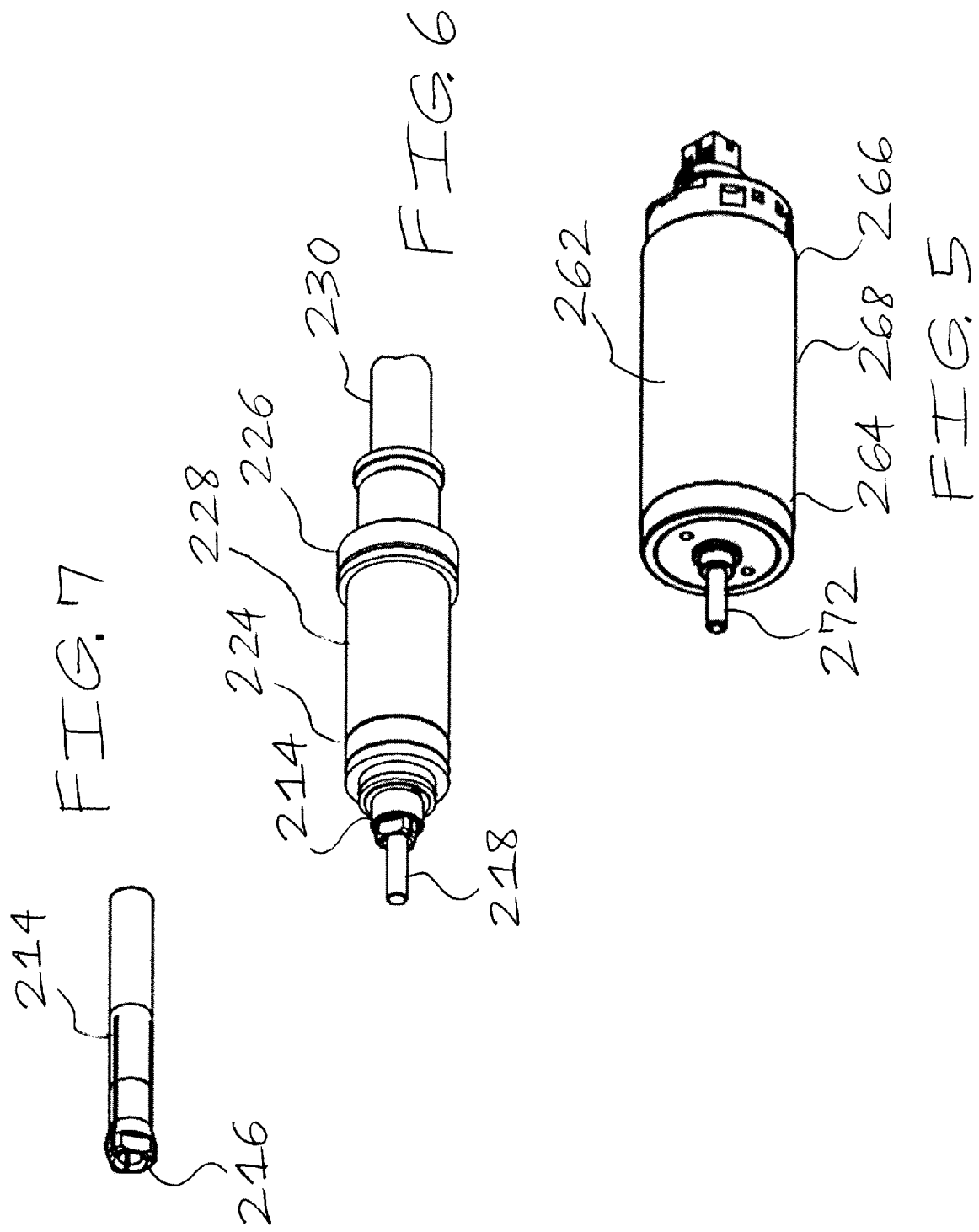

PORTABLE AND RECHARGEABLE DRILL SYSTEM

BACKGROUND OF THE INVENTION

The present invention generally relates to drills, drill devices, drill apparatuses, and drill systems. More specifically, the present invention is a portable and rechargeable drill system, preferably a lightweight, portable and rechargeable drill system, that allows a user to conveniently carry on the user's body and perform work.

DESCRIPTION OF THE RELATED ART

Drills, portable drills, rechargeable drills, and portable and rechargeable drills are known in the art.

Many drills, portable drills, rechargeable drills, and portable and rechargeable drills known in the art are heavy in weight and/or are cumbersome for a user to work with due to the need for a power cord providing a power source to the drill.

It is an object of the present invention to provide a portable and rechargeable drill system that is both light in weight and does not require a cumbersome power cord such that a user can conveniently carry on the user's body and perform work.

The present invention overcomes one or more of the shortcomings of the above described drills, portable drills, rechargeable drills, and portable and rechargeable drills. The Applicants are unaware of inventions or patents, taken either singly or in combination, which are seen to describe the present invention as claimed.

SUMMARY OF THE INVENTION

The present invention is a portable and rechargeable drill system, preferably a lightweight, portable and rechargeable drill system, that allows a user to conveniently carry on the user's body and perform work.

As a preferred and non-limiting example, the lightweight, portable and rechargeable drill system is comprised of a drill handpiece, a battery-powered control device, and a securing member or mechanism for the drill handpiece. The drill system may further comprise a control device case or holder.

The drill handpiece is preferably a direct current (DC) drill handpiece that preferably comprises a first end, a second end, a drill bit-spindle and housing assembly, a drill bit locking mechanism, a motor and housing assembly, and a power cord.

The securing member or mechanism for the drill handpiece is adapted for detachably securing the drill handpiece.

The control device preferably comprises some or all of the following: a housing, a motor speed control member, a motor rotation direction control member, a drill handpiece connector port or terminal, a power indicator LED, a battery indicator LED, a power connector port or terminal, a battery (preferably a rechargable battery), and a control printed circuit board (control PCB).

The control device case or holder preferably comprises a front, a rear, a right side, a left side, a top, a bottom, a control device-receiving chamber, the securing member or mechanism for the drill handpiece, and a carrying clip.

BRIEF DESCRIPTION OF THE DRAWINGS

FIG. 4 is a perspective view of a drill handpiece of the portable and rechargeable drill system of FIG. 1;

FIG. 5 is a perspective view of a motor of a motor assembly of the portable and rechargeable drill system of FIG. 1;

FIG. 6 is a perspective view of a spindle assembly of a drill bit-spindle and housing assembly of the portable and rechargeable drill system of FIG. 1;

FIG. 7 is a perspective view of a drill bit holder of a drill bit-spindle and housing assembly of the portable and rechargeable drill system of FIG. 1;

It should be understood that the above-attached figures are not intended to limit the scope of the present invention in any way.

DETAILED DESCRIPTION OF THE PREFERRED EMBODIMENTS

Referring to FIGS. 1-13, the present invention is a portable and rechargeable drill system that allows a user to conveniently carry on the user's body and perform work. Preferably, the portable and rechargeable drill system is a lightweight, portable and rechargeable drill system 100.

Figure 1:
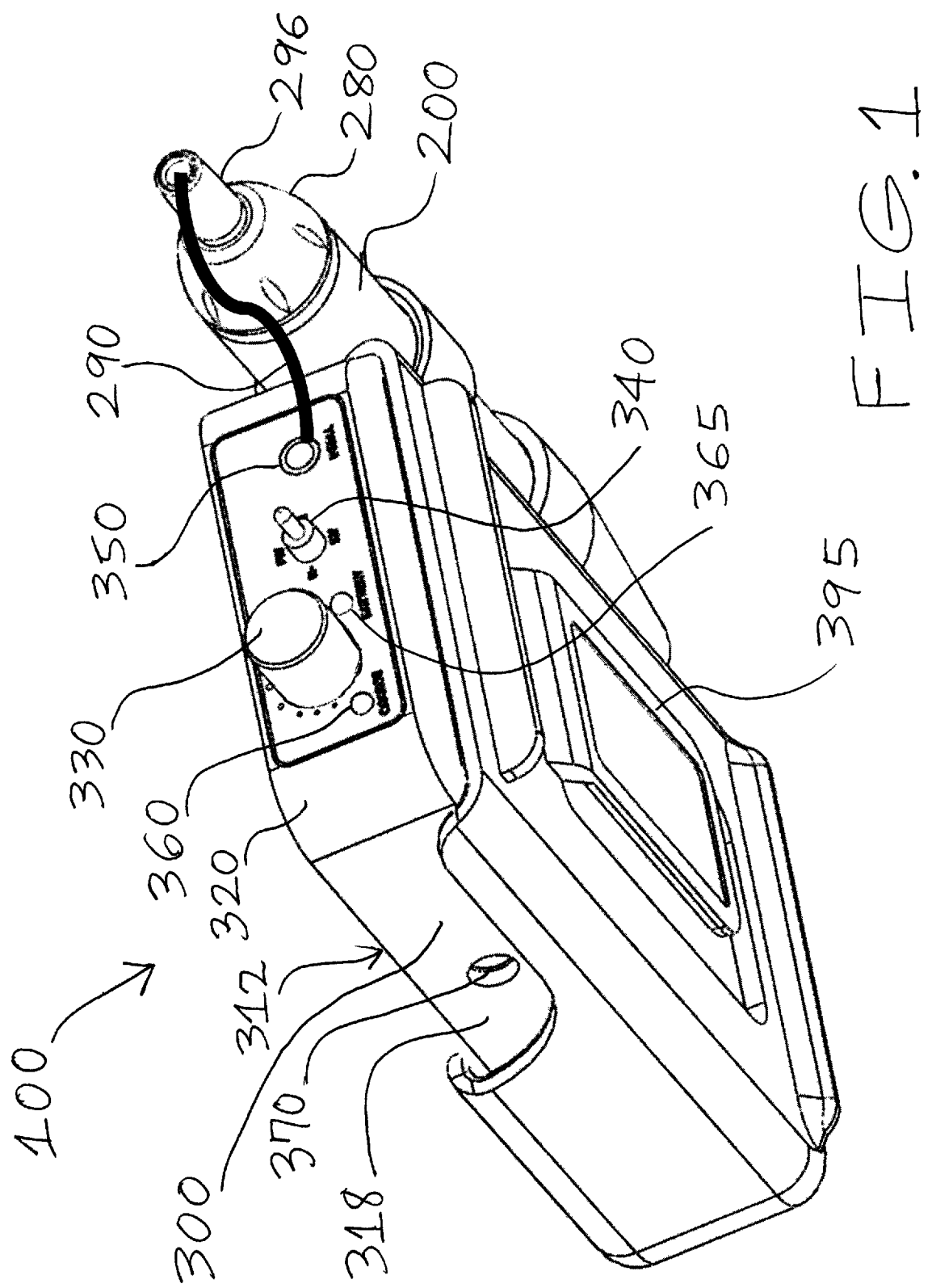
FIG. 1 is a perspective, top and rear view of a portable and rechargeable drill system according to the present invention.
Figure 2:
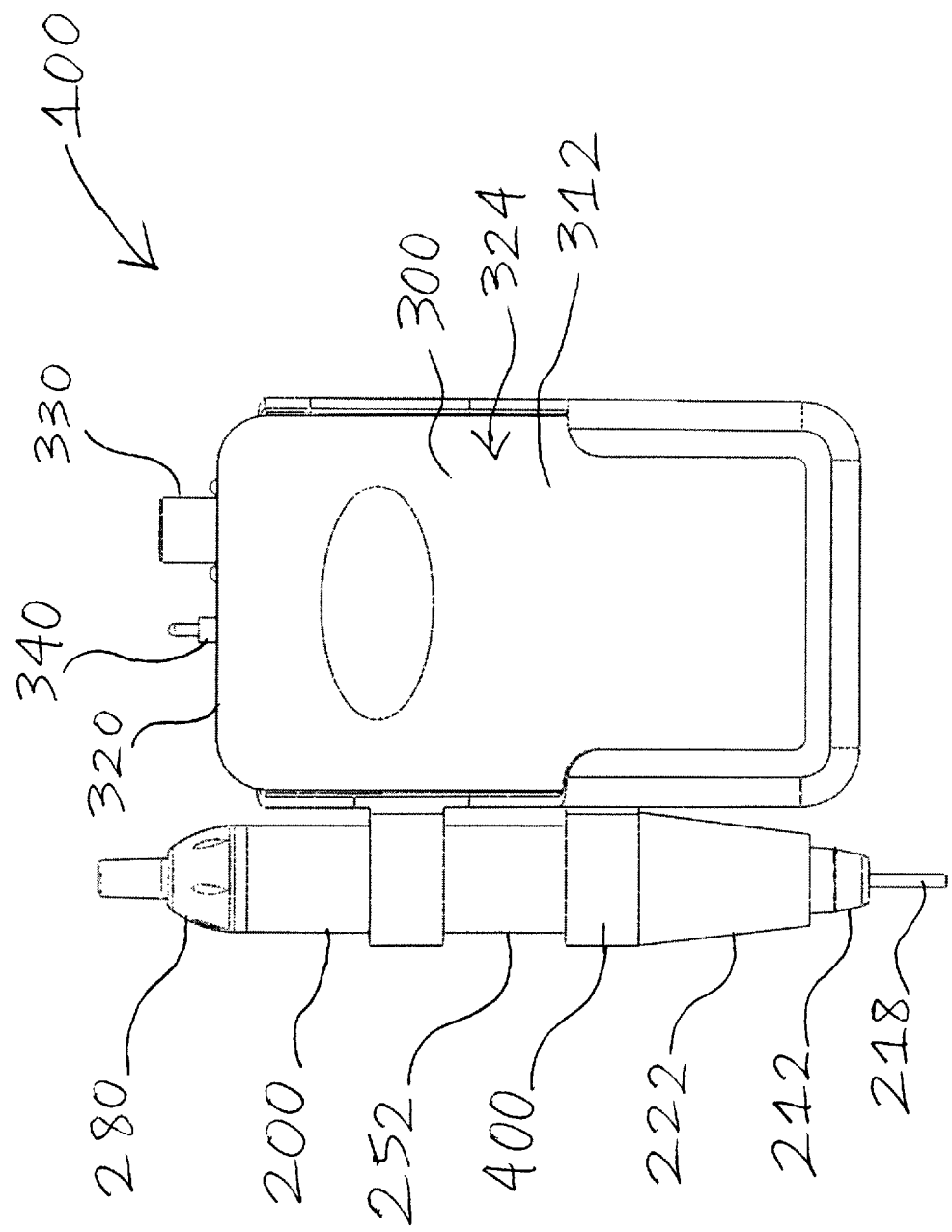
FIG. 2 is a front view of the portable and rechargeable drill system of FIG. 1.

As shown in FIGS. 1 and 2 and as a preferred and non-limiting example, the lightweight, portable and rechargeable drill system 100 is comprised of a drill handpiece 200, a battery-powered control device 300, and a securing member or mechanism 416 for the drill handpiece. The drill system 100 may further comprise a control device case or holder 400.

As best shown in FIGS. 1-9, the drill handpiece 200 is preferably a brush or brushless direct current (DC) drill handpiece that preferably comprises a first end 202, a second end 204, a drill bit-spindle and housing assembly, a drill bit locking mechanism, a motor and housing assembly, a flexible power cord 290, and a cable strain relief holder 280.

As best shown in FIGS. 4-9, the drill bit-spindle and housing assembly comprises a drill bit-spindle housing 222, a drill bit holder 214, a front ball bearing 224, a rear ball bearing 226, a spindle assembly or body 228, and a motor shaft receiver 230. The drill bit-spindle and housing assembly may also comprise one drill bit 218 or a plurality of interchangeable drill bits 218. The motor shaft receiver 230 is rotationally coupled to the drill bit holder 214, so that when the motor shaft 272 rotates, the drill bit holder 214 also rotates at the same speed and in the same axis.

The drill bit-spindle housing 222 comprises a first end 232, a second end 234, and a body 236 extending between the first end 232 and second end 234. The drill bit-spindle housing 222 houses the front ball bearing 224, rear ball bearing 226, spindle assembly or body 228, motor shaft receiver 230, and drill bit holder 214, which has a drill bit port 216 dimensioned and configured for receiving the drill bit 218.

The motor shaft receiver 230 is dimensioned and configured for receiving a motor shaft 272.

As best shown in FIGS. 4-9, the drill bit locking mechanism comprises a drill bit lock cap 242 located between drill bit-spindle housing 222 and motor housing 252, a rotator 244, a lock wheel 246, a guider 248, and a rubber ring 249. The drill bit locking mechanism is configured to receive the spindle assembly 228. Preferably, the drill bit lock cap 242 rotates in clockwise or counter clockwise directions to lock or unlock the drill bit 218. The rotator 244 is connected to the drill bit lock cap 242, and the lock wheel 246 moves with the rotator 244. The guider 248 is for the lock wheel 246 to move up and down along the guider 248. The rubber ring 249 is to reduce the high speed vibration noise around the rotator 244, drill bit lock cap 242, and the guider 248. When the drill bit lock cap 242 rotates, the lock wheel 246 moves up or down whereby this puts force on the drill bit holder 214 to release or lock, respectively, the drill bit 218.

As best shown in FIGS. 4-9, the motor and housing assembly comprises a motor housing 252, a motor 262, and the motor shaft 272.

The motor housing 252 houses the motor 262, and comprises a first end 254, a second end 256, and housing body 258 extending between the first end 254 and second end 256. The first end 254 engages with the drill bit lock cap 242 of the drill bit locking mechanism while the second end 256 engages with, or is positioned adjacent to, the cable strain relief holder 280. The motor housing 252 is preferably made or manufactured of a metal material for motor heat dissipation.

Preferably, the motor 262 is a brushed or brushless direct current (DC) motor. Alternatively, the motor 262 may be an alternating current (AC) motor. The motor 262 comprises a first end 264, a second end 266, and a motor body 268 extending between the first end 264 and second end 266. The motor shaft 272 extends from the first end 264 of the motor 262 while the second end 266 of the motor 262 engages with the flexible power cord 290 such that the motor 262, and thus, the drill handpiece 200, receive power from the control device 300.

The flexible power cord 290 provides freedom for the user to maneuver while also having the drill handpiece 200 be supplied with a necessary power supply.

Figure 3:
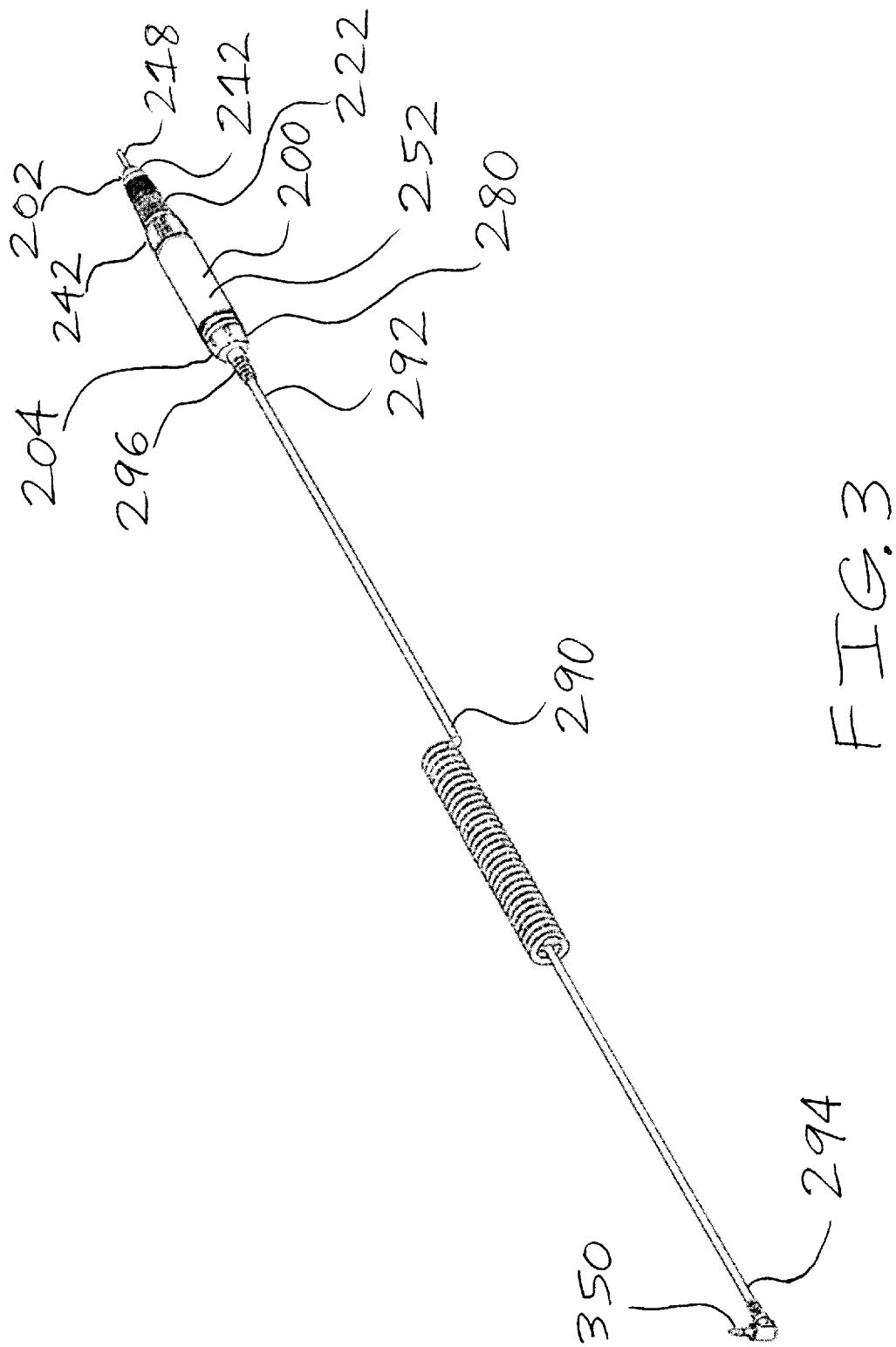
FIG. 3 is a perspective view of a drill handpiece and a power cord of the portable and rechargeable drill system of FIG. 1.
Figure 8:
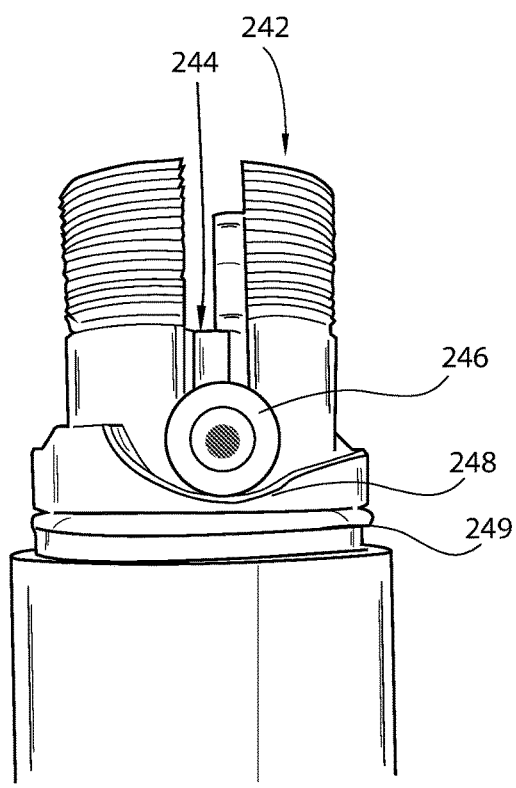
FIG. 8 is a perspective view of a drill bit locking mechanism of the portable and rechargeable drill system of FIG. 1, in a first position.
Figure 9:
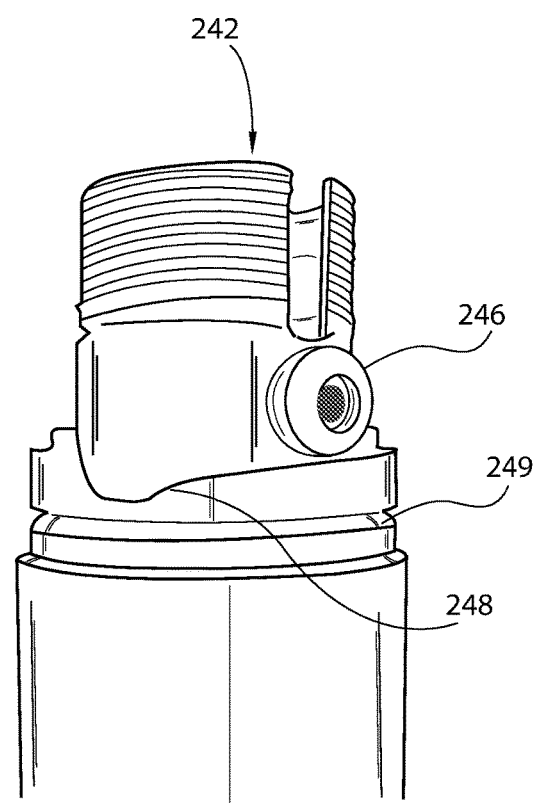
FIG. 9 is a perspective view of the drill bit locking mechanism of the portable and rechargeable drill system of FIG. 8, in a second position.
Figure 10:
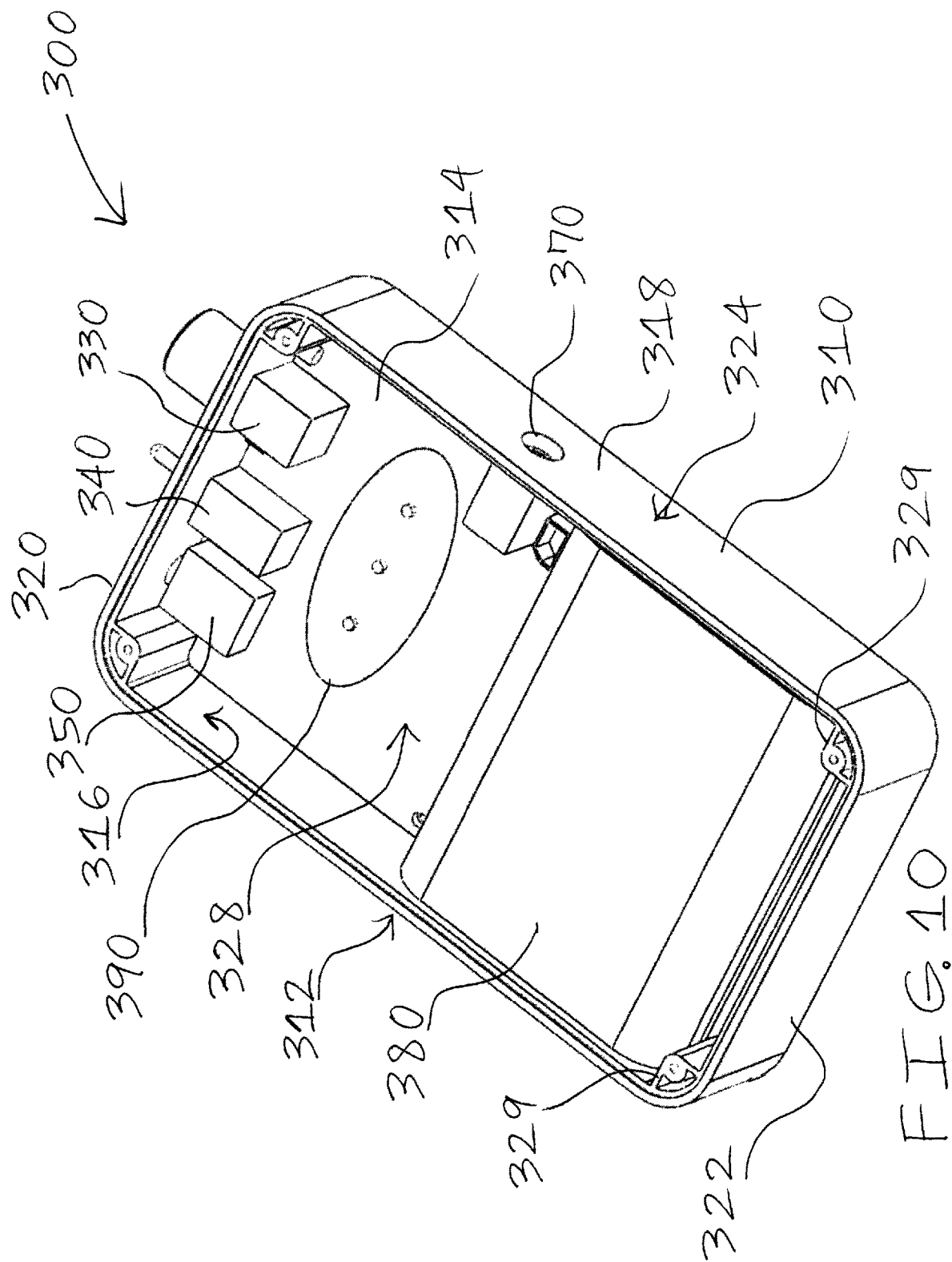
FIG. 10 is an internal, perspective view of a control device of the portable and rechargeable drill system of FIG. 1.
Figure 11:
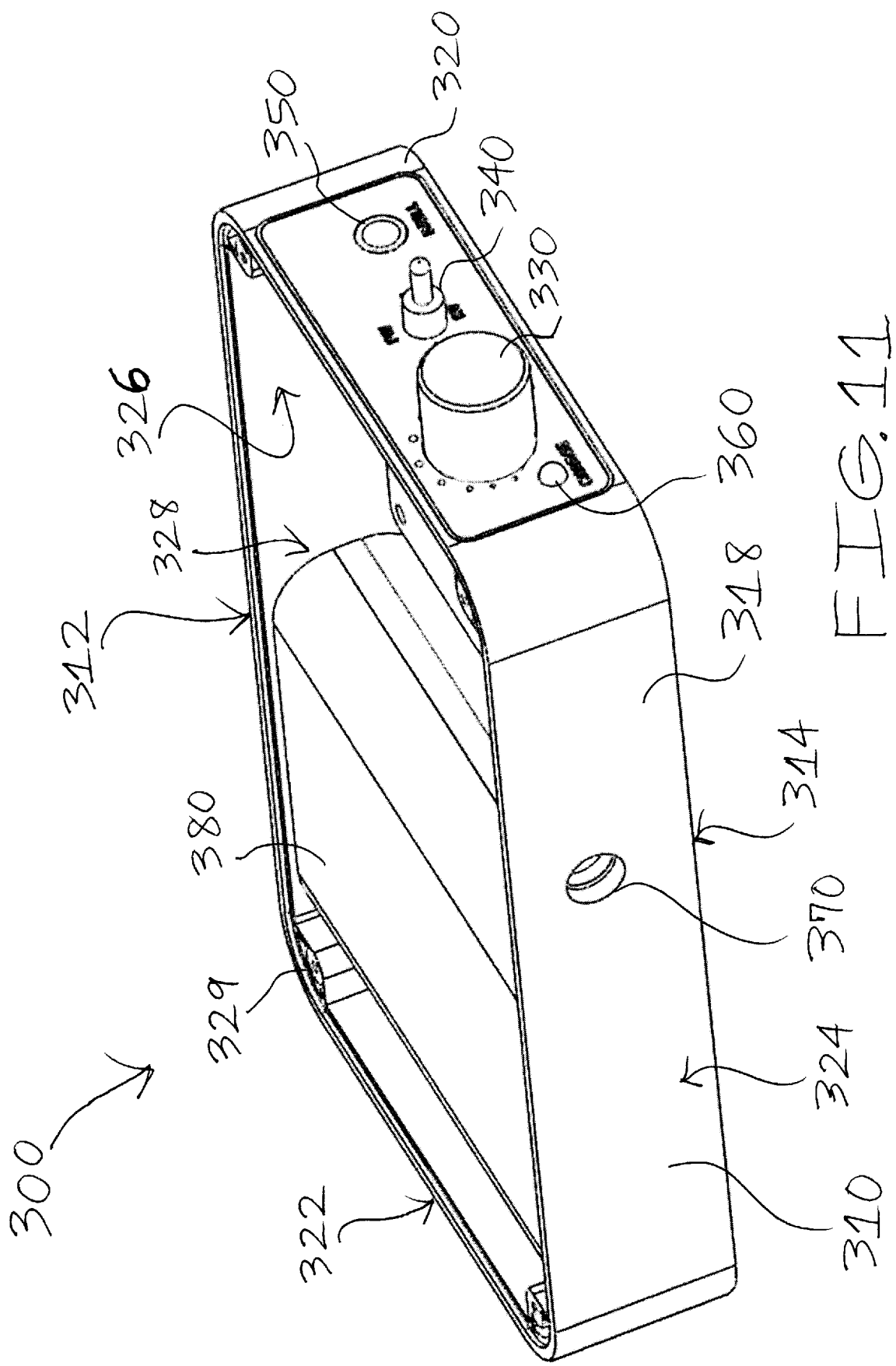
FIG. 11 is a front, top perspective view of the control device of the portable and rechargeable drill system of FIG. 10.

As best shown in FIGS. 1 and 3, the flexible power cord 290 comprises a first end 292, a second end 294, and a cable strain relief 296 located at the first end 292. The first end 292 of the flexible power cord 290 is secured or attached to the second end 204 of the drill handpiece 200 wherein the cable strain relief 296 is secured or attached to the cable strain relief holder 280. The second end 294 of the flexible power cord 290 is secured or attached to the drill handpiece connector port or terminal 350 of the control device 300.

As best shown in FIGS. 1-2 and 10-13, the control device 300 comprises a housing 310, a motor speed control member 330, a motor rotation direction control member 340, a drill handpiece connector port or terminal 350, a power indicator LED 360, a battery indicator LED 365, a power connector port or terminal 370, a battery 380, and a control printed circuit board (control PCB) 390.

As best shown in FIGS. 1-2 and 10-11, the housing 310 includes a front 312, a rear 314, a right side 316, a left side 318, a top 320, a bottom 322, an outer surface 324, an inner surface 326, and a battery-receiving chamber 328. The battery-receiving chamber 328 is defined by the front 312, rear 314, right side 316, left side 318, top 320, and bottom 322, and is dimensioned and configured for receiving the battery 380. Preferably, a portion of the battery-receiving chamber 328 has tight-fitting dimensions to help detachably secure the battery within the battery-receiving chamber 328. Alternatively, the housing 310 may include other components, such as, but not limited to, tabs or inner corners 329, or methods to help detachably secure the battery 380 within the battery-receiving chamber 328. The housing 310 is preferably made or manufactured of a plastic material or engineered plastics for heat insulation and to help the portable and rechargeable drill system 100 be as lightweight as possible. Alternatively, the housing 310 may be made or manufactured of other suitable materials, such as, but not limited to, a metal material, a wood material, or any combination of a plastic material, a metal material, and a wood material.

The motor speed control member 330 may be positioned at the top 320 of the housing 310, and is adjustable by the user to adjust the performance or working speed of the drill handpiece 200.

The motor rotation direction control member 340 may be also positioned at the top 320 of the housing 310, and is adjustable by the user to adjust the rotation direction of the drill handpiece 200.

The drill handpiece connector port or terminal 350 is preferably a DC drill handpiece connector port or terminal 350 that may be further positioned at the top 320 of the housing 310, and is dimensioned and configured for receiving the second end 294 of the flexible power cord 290 so that power can be provided to the drill handpiece 200.

The power indicator LED 360 may be additionally positioned at the top 320 of the housing 310, and provides indication to the user as to whether the power for the control device 300 is ON or OFF.

The battery indicator LED 365 may be additionally positioned at the top 320 of the housing 310, and provides indication to the user as to whether the battery 380 still has energy remaining.

The power connector port or terminal 370 may be positioned on the left side 318 of the housing 310, and is dimensioned and configured for receiving power from an outside power source.

The battery 380 is dimensioned and configured for being positioned within the housing 310, preferably detachably secured within the battery-receiving chamber 328. The battery 380 may be any battery known to one of ordinary skill in the art. Preferably, the battery 380 is a rechargeable battery, such as, but not limited to, lithium-type rechargeable batteries. However, a lithium-type battery is preferred for high power, compact, and light weight for this control device 300. But, the charging and discharging control for a rechargable lithium battery in portable and wearable devices is much more complex compared to other types of batteries.

The control printed circuit board (control PCB) 390 is preferably secured or attached to the inner surface 326 of the housing 310 by any method known to one of ordinary skill in the art. Preferably, the control PCB 390 comprises a battery charging circuit and battery voltage monitoring and DC motor driving circuitry, a battery power monitoring circuitry, a microprocessor, and a software to control the motor revolution per minute (RPM).

As shown in FIGS. 1 and 2, the control device case or holder 400 comprises a front 402, a rear 404, a right side 406, a left side 408, a top 410, a bottom 412, a control device-receiving chamber 414, the securing member or mechanism 416 for the drill handpiece, and a carrying clip 418.

The control device-receiving chamber 414 is defined by the front 402, rear 404, right side 406, left side 408, top 410, and bottom 412 of the control device case or holder 400, and is dimensioned and configured for receiving the control device 300. Preferably, the control device case or holder 400 is able to detachably secure the control device 300 effectively within the control device-receiving chamber 414 as a result of the configuration and/or tight-fitting dimensions of the front 402, rear 404, right side 406, left side 408, top 410, bottom 412 by wrapping around some of the edges and/or corners of the housing 310 of the control device 300. Alternatively, the control device case or holder 400 may include other components or features, such as the top 410 being closed and secured, to detachably secure the control device 300 effectively within the control device-receiving chamber 414. The control device case or holder 400 is preferably made or manufactured of a plastic material or engineered plastics to help the portable and rechargeable drill system 100 be as lightweight as possible. Alternatively, the control device case or holder 400 may be made or manufactured of other suitable materials, such as, but not limited to, leather, a fake leather material, a metal material, a wood material, or any combination of a plastic material, leather, a fake leather material, a metal material, and a wood material.

The securing member or mechanism 416 for the drill handpiece is dimensioned and configured for receiving the drill handpiece 200. Preferably, the securing member or mechanism 416 for the drill handpiece is positioned on the outer surface 324 and right side 316 of the control device 300. Preferably, the securing member or mechanism 416 for the drill handpiece is able to detachably secure the drill handpiece 200 effectively as a result of the configuration and/or tight-fitting dimensions of the securing member or mechanism 416 for the drill handpiece by partially or fully wrapping around the drill handpiece 200.

The carrying clip 395 is for detachably securing or attaching the lightweight, portable and rechargeable drill system 100 to the user's belt or clothing. Preferably, the carrying clip 395 is similar or substantially similar to certain carrying clips that are used in detachably securing or attaching cellular or mobile phones or smartphones to the user's belt or clothing.

Figure 12:
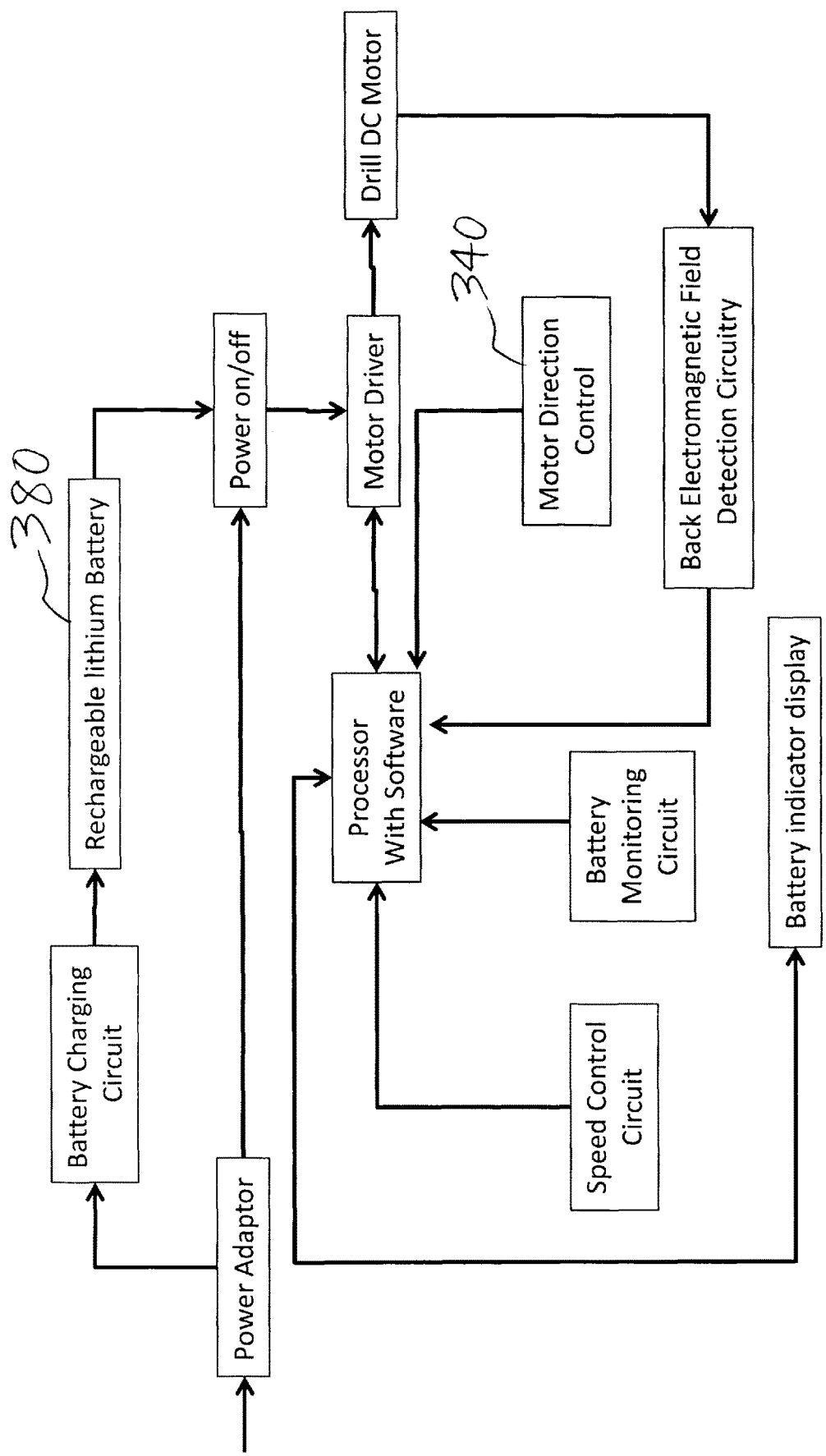
FIG. 12 is a sensorless, brushless control circuit block diagram according to the present invention.

FIG. 12 shows a sensorless, brushless control circuit block diagram.

Figure 13:
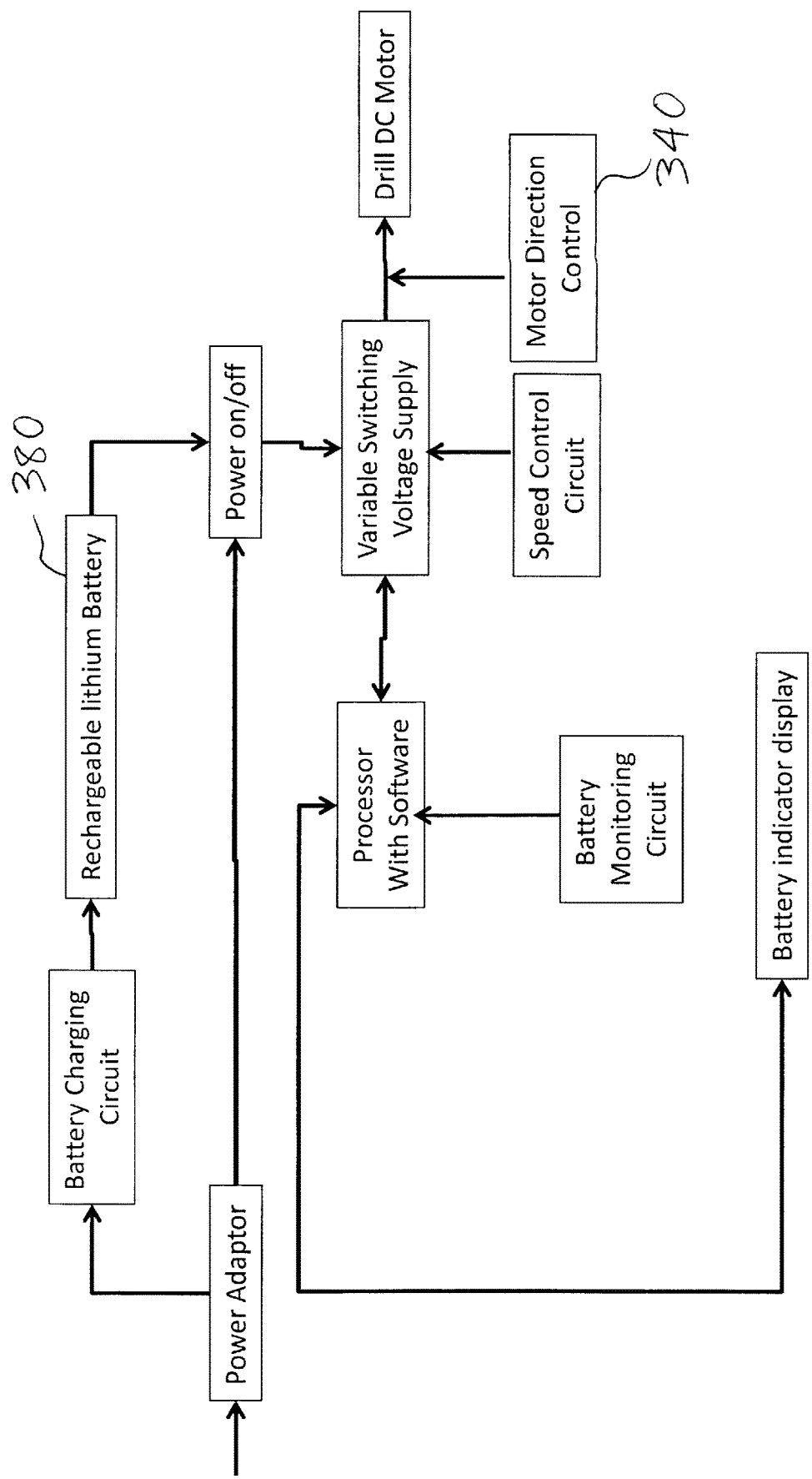
FIG. 13 is a brushed DC motor speed control circuit block diagram according to the present invention.

FIG. 13 shows a brushed DC motor speed control circuit block diagram.

While the present invention is susceptible to various modifications and alternative forms, specific embodiments thereof have been shown by way of example in the drawings and are herein described in detail. It should be understood, however, that the description herein of specific embodiments is not intended to limit the present invention to the particular forms disclosed.

What is claimed is:

1. A portable drill system comprising:
   a drill handpiece comprising a first end, a second end, a drill bit-spindle assembly, a drill bit locking assembly, a motor, and a motor housing,
   wherein said drill bit-spindle assembly comprises a drill bit holder, a spindle assembly, and a motor shaft receiver,
   wherein said drill bit locking assembly is adapted for locking a drill bit to said drill handpiece,
   wherein said motor housing comprises a first end, a second end, and a body extending between said first end and said second end of said motor housing,
   wherein said first end of said motor housing engages with a drill bit lock cap of said drill bit locking assembly,
   wherein said motor shaft receiver is rotationally coupled to said drill bit holder such that when a motor shaft of said motor rotates, said drill bit holder also rotates at same speed and along same axis as that of said motor shaft; and
   a control device comprising a housing, a control printed circuit board (PCB), a drill handpiece connector terminal, and a motor speed control element,
   wherein said motor speed control element is adjustable by the user to adjust performance or working speed of said drill handpiece, and
   wherein said control PCB comprises a battery charging circuit and a direct current (DC) motor driving circuitry.

2. The portable drill system according to claim 1, further comprising a battery, and wherein said housing of said control device comprises a battery-receiving chamber dimensioned and configured for receiving said battery.

3. The portable drill system according to claim 2, wherein said battery is a rechargeable battery.

4. The portable drill system according to claim 2, wherein said control device further comprises a battery indicator LED and a power connector terminal.

5. The portable drill system according to claim 1, wherein said drill handpiece is a brush direct current (DC) drill.

6. The portable drill system according to claim 1, wherein said drill bit lock cap is internally coupled to said drill bit holder for drill bit lock and release.

7. The portable drill system according to claim 1, wherein said drill bit-spindle assembly further comprises at least one drill bit.

8. The portable drill system according to claim 1, further comprising a control device holder dimensioned and configured for receiving and detachably securing said control device.

9. The portable drill system according to claim 1, further comprising a handpiece holder dimensioned and configured for receiving and detachably securing said drill handpiece.

10. The portable drill system according to claim 1, wherein said control device provides power to said drill handpiece via a power cord, wherein said drill handpiece further comprises cable strain relief holder, wherein said power cord further comprises a cable strain relief at said second end of said power cord, and wherein said cable strain relief is secured or attached to said cable strain relief holder.

11. The power cord according to claim 10, wherein said power cord further comprises a coiled section of a spring coiled-type cable.

12. The portable drill system according to claim 1, wherein said control device further comprises a motor rotation direction control element, and wherein said motor rotation direction control element is adjustable by the user to adjust rotation direction of said drill handpiece.

13. The portable drill system according to claim 1, wherein said motor shaft receiver is dimensioned and configured for receiving said motor shaft.

14. The portable drill system according to claim 1, wherein a drill bit holder front end port is dimensioned and configured for receiving a drill bit, and wherein said drill bit holder front end has at least a slot around a body of said drill bit holder so that a diameter of said drill bit holder front end port is able to change during operation for lock or release of the drill bit.

15. The portable drill system according to claim 1, wherein said motor shaft extends from a first end of said motor through said drill bit lock cap and rotationally coupled with a spindle motor shaft receiver.

16. The portable drill system according to claim 1, wherein said control device further comprises an on/off switch.

17. The portable drill system according to claim 1, wherein said drill handpiece connector terminal is dimensioned and configured for receiving a power cord for providing power to said drill handpiece.

18. The portable drill system according to claim 1, wherein said drill handpiece is a brushless direct current (DC) drill.

19. The portable drill system according to claim 1, wherein said direct current (DC) motor driving circuitry is a brushless direct current (DC) motor driving circuitry.

20. The portable drill system according to claim 1, wherein said control device further comprises a microprocessor and software to control motor revolution per minute (RPM).

21. The portable drill system according to claim 20, wherein said microprocessor and software to control motor revolution per minute (RPM) is for a brushless direct current (DC) drill.

22. A portable drill system comprising:
a drill handpiece comprising a first end, a second end, a drill bit-spindle assembly, a drill bit locking assembly, a motor, and a motor housing,
wherein said drill bit-spindle assembly comprises a drill bit holder, a spindle assembly, and a motor shaft receiver,
wherein said motor housing comprises a first end, a second end, and a body extending between said first end and said second end of said motor housing,
wherein said first end of said motor housing engages with a drill bit lock cap of said drill bit locking assembly,
wherein said motor shaft receiver is rotationally coupled to said drill bit holder such that when a motor shaft of said motor rotates, said drill bit holder also rotates at same speed and along same axis as that of said motor shaft;
a control device comprising a housing, a control printed circuit board (PCB), a drill handpiece connector terminal, and a motor speed control element,
wherein said housing of said control device comprises a battery-receiving chamber,
wherein said motor speed control element is adjustable by the user to adjust performance or working speed of said drill handpiece, and
wherein said control PCB comprises a battery charging circuit and a direct current (DC) motor driving circuitry; and
a lithium rechargeable battery.

23. The portable drill system according to claim 22, wherein said motor shaft extends from a first end of said motor through said drill bit lock cap and rotationally coupled with a spindle motor shaft receiver.

24. The portable drill system according to claim 22, wherein said drill bit lock cap is internally coupled to said drill bit holder for drill bit lock and release.

25. The portable drill system according to claim 22, wherein said control device further comprises a battery indicator LED and a power connector terminal.

26. The portable drill system according to claim 22, wherein said direct current (DC) motor driving circuitry is a brushless direct current (DC) motor driving circuitry.

27. The portable drill system according to claim 22, wherein said control device further comprises a microprocessor and software to control motor revolution per minute (RPM).

28. The portable drill system according to claim 27, wherein a microprocessor and software to control motor revolution per minute (RPM) is for a brushless direct current (DC) drill.

29. The portable drill system according to claim 22, wherein a drill bit holder front end port is dimensioned and configured for receiving a drill bit, and wherein said drill bit holder front end has at least a slot around a body of said drill bit holder so that a diameter of said drill bit holder front end port is able to change during operation for lock or release of the drill bit.

30. The portable drill system according to claim 22, wherein said drill handpiece is a brushless direct current (DC) drill.

31. The portable drill system according to claim 22, wherein said drill handpiece is a brush direct current (DC) drill.

32. The portable drill system according to claim 22, wherein said drill bit lock cap is internally coupled to said drill bit holder for a drill bit lock and release.

33. The portable drill system according to claim 22, wherein said drill bit-spindle assembly further comprises at least one drill bit.

34. The portable drill system according to claim 22, further comprising a control device holder dimensioned and configured for receiving and detachably securing said control device.

35. The portable drill system according to claim 22, further comprising a handpiece holder dimensioned and configured for receiving and detachably securing said drill handpiece.

36. The portable drill system according to claim 22, wherein said control device provides power to said drill handpiece via a power cord.

37. The portable drill system according to claim 36, wherein said power cord further comprises a coiled section of a spring coiled-type cable.

38. The portable drill system according to claim 36, wherein said power cord further comprises a cable strain relief at a second end of said power cord.

39. The portable drill system according to claim 22, wherein said drill handpiece further comprises a cable strain relief holder.

40. The portable drill system according to claim 22, wherein said control device further comprises a motor rotation direction control element.

41. The portable drill system according to claim 40, wherein said motor rotation direction control element is adjustable by the user to adjust rotation direction of said drill handpiece.

42. The portable drill system according to claim 22, wherein said motor shaft receiver is dimensioned and configured for receiving said motor shaft.

43. The portable drill system according to claim 22, wherein a drill bit holder front end port is dimensioned and configured for receiving a drill bit, and wherein said drill bit holder front end has at least a slot around a body of said drill bit holder so that a diameter of said drill bit holder front end port is able to change during operation for lock or release of the drill bit.

44. The portable drill system according to claim 22, wherein said motor shaft extends from a first end of said motor through said drill bit lock cap and rotationally coupled with a spindle motor shaft receiver.

45. The portable drill system according to claim 22, wherein said control device further comprises an on/off switch.

46. The portable drill system according to claim 22, wherein said drill handpiece connector terminal is dimensioned and configured for receiving a power cord for providing power to said drill handpiece.

47. A drill handpiece for a portable drill system comprising:
a first end, a second end, a drill bit-spindle assembly, a drill bit locking assembly, a motor, and a motor housing,
wherein said drill bit-spindle assembly comprises a drill bit holder, a spindle assembly, and a motor shaft receiver,
wherein said motor shaft receiver is dimensioned and configured for receiving a motor shaft,
wherein said motor housing comprises a first end, a second end, and a body extending between said first end and said second end of said motor housing,
wherein said motor housing houses said motor,
wherein said first end of said motor housing engages with a drill bit lock cap of said drill bit locking assembly,
wherein said motor shaft receiver is rotationally coupled to said drill bit holder such that when a motor shaft of said motor rotates, said drill bit holder also rotates at same speed and along same axis as that of said motor shaft,
wherein a drill bit holder front end port is dimensioned and configured for receiving a drill bit,
wherein said motor shaft extends from a first end of said motor through said drill bit lock cap and rotationally coupled with a spindle motor shaft receiver; and
wherein motor speed is adjustable by the user to adjust performance or working speed of said drill handpiece a motor speed control element located on a control device.

48. The drill handpiece for a portable drill system according to claim 47, wherein said drill handpiece is a brush direct current (DC) drill.

49. The drill handpiece for a portable drill system according to claim 47, wherein said drill handpiece is a brushless direct current (DC) drill.

50. The drill handpiece for a portable drill system according to claim 47, wherein said drill bit lock cap is internally coupled to said drill bit holder for drill bit lock and release.

51. The drill handpiece for a portable drill system according to claim 47, wherein said drill bit-spindle assembly further comprises at least one drill bit.

52. The drill handpiece for a portable drill system according to claim 47, further comprising a handpiece holder dimensioned and configured for receiving and detachably securing said drill handpiece.

53. The drill handpiece for a portable drill system according to claim 47, wherein said drill handpiece further comprises cable strain relief holder.

54. The drill handpiece for a portable drill system according to claim 47, wherein said motor shaft extends from a first end of said motor through said drill bit lock cap and rotationally coupled with a spindle motor shaft receiver.

55. The drill handpiece for a portable drill system according to claim 47, wherein said drill handpiece connector terminal is dimensioned and configured for receiving a power cord for providing power to said drill handpiece.

56. The drill handpiece for a portable drill system according to claim 47, further comprising a control device.

57. The drill handpiece for a portable drill system according to claim 56, further comprising a housing and a direct current (DC) motor driving circuitry.

58. The drill handpiece for a portable drill system, according to claim 57, further comprising a motor rotation direction control element.

59. The drill handpiece for a portable drill system according to claim 58, wherein said motor rotation direction control element is adjustable by the user to adjust rotation direction of said drill handpiece.

60. The drill handpiece for a portable drill system according to claim 57, further comprising a battery indicator LED and a power connector terminal.

61. The drill handpiece for a portable drill system according to claim 57, further comprising a control device holder dimensioned and configured for receiving and detachably securing said control device.

62. The drill handpiece for a portable drill system according to claim 57, wherein said control device provides power to said drill handpiece via a power cord.

63. The drill handpiece for a portable drill system according to claim 62, wherein said power cord further comprises a coiled section of a spring coiled-type cable.

64. The drill handpiece for a portable drill system according to claim 57, further comprising a motor speed control element.

65. The drill handpiece for a portable drill system according to claim 57, wherein said direct current (DC) motor driving circuitry is a brushless direct current (DC) motor driving circuitry.

66. The drill handpiece for a portable drill system according to claim 57, further comprising a microprocessor and software to control motor revolution per minute (RPM).

67. The drill handpiece for a portable drill system according to claim 66, wherein said microprocessor and software to control motor revolution per minute (RPM) is for a brushless direct current (DC) drill.

68. The drill handpiece for a portable drill system according to claim 57, further comprising a battery.

69. The drill handpiece for a portable drill system according to claim 68, wherein said battery is a rechargeable battery.

70. The drill handpiece for a portable drill system according to claim 57, further comprising a control printed circuit board (PCB).

71. The drill handpiece for a portable drill system according to claim 57, further comprising an on/off switch.

72. A method of using a portable drill system comprising the steps of:
providing said portable drill system comprising a drill handpiece, a drill bit, and a control device,
wherein said drill handpiece comprises a first end, a second end, a drill bit-spindle assembly, a drill bit locking assembly, a motor, and a motor housing,
wherein said drill bit-spindle assembly comprises a drill bit holder, a spindle assembly, and a motor shaft receiver, wherein said drill bit locking assembly is adapted for locking a drill bit to said drill handpiece, wherein said motor housing comprises a first end, a second end, and a body extending between said first end and said second end of said motor housing, wherein said first end of said motor housing engages with a drill bit lock cap of said drill bit locking assembly, wherein said motor shaft receiver is rotationally coupled to said drill bit holder such that when a motor shaft of said motor rotates, said drill bit holder also rotates at same speed and along same axis as that of said motor shaft, wherein said control device comprises a housing, a control printed circuit board (PCB), a drill handpiece connector terminal, and a motor speed control element, wherein said control device provides power to said drill handpiece, wherein said motor speed control element is adjustable by the user to adjust performance or working speed of said drill handpiece, and wherein said control PCB comprises a battery charging circuit and a direct current (DC) motor driving circuitry;

inserting a drill bit to said drill bit holder; and locking the drill bit to said drill bit holder.

73. The method according to claim 72, wherein said control device further comprises a battery.

74. The method according to claim 73, wherein said battery is a rechargeable battery.

75. The method according to claim 72, wherein said control device further comprises a battery indicator LED and a power connector terminal.

76. The method according to claim 72, wherein said drill handpiece is a brush direct current (DC) drill.

77. The portable drill system according to claim 72, wherein said drill bit lock cap is internally coupled to said drill bit holder for drill bit lock and release.

78. The method according to claim 72, wherein said portable drill system further comprises a control device holder dimensioned and configured for receiving and detachably securing said control device.

79. The method according to claim 72, wherein said portable drill system further comprises a handpiece holder dimensioned and configured for receiving and detachably securing said drill handpiece.

80. The method according to claim 72, wherein said control device provides power to said drill handpiece via a power cord.

81. The method according to claim 80, wherein said power cord further comprises a coiled section of a spring coiled-type cable.

82. The method according to claim 80, wherein said power cord further comprises a cable strain relief at said second end of said power cord, and wherein said cable strain relief is secured or attached to said cable strain relief holder.

83. The method according to claim 72, wherein said drill handpiece further comprises cable strain relief holder.

84. The method according to claim 72, wherein said control device further comprises a motor rotation direction control element.

85. The method according to claim 84, wherein said motor rotation direction control element is adjustable by the user to adjust rotation direction of said drill handpiece.

86. The method according to claim 72, wherein said motor shaft receiver is dimensioned and configured for receiving said motor shaft.

87. The method according to claim 72, wherein said motor shaft extends from a first end of said motor through said drill bit lock cap and rotationally coupled with a spindle motor shaft receiver.

88. The method according to claim 72, wherein said control device further comprises an on/off switch.

89. The method according to claim 72, wherein said drill handpiece connector terminal is dimensioned and configured for receiving a power cord for providing power to said drill handpiece.

90. The method according to claim 72, wherein said drill handpiece is a brushless direct current (DC) drill.

91. The method according to claim 72, wherein said direct current (DC) motor driving circuitry is a brushless direct current (DC) motor driving circuitry.

92. The method according to claim 72, wherein said control device further comprises a microprocessor and software to control motor revolution per minute (RPM).

93. The method according to claim 92, wherein said microprocessor and software to control motor revolution per minute (RPM) is for a brushless direct current (DC) drill.

\* \* \* \* \*